United States Patent [19]

Kakavas

[11] Patent Number: 4,679,818
[45] Date of Patent: Jul. 14, 1987

[54] DISPLAY TABLE ATTACHMENT FOR SHOPPING CARTS

[75] Inventor: Dorothy A. Kakavas, Moline, Ill.

[73] Assignee: Aadams Merchandising, Inc., Moline, Ill.

[21] Appl. No.: 827,580

[22] Filed: Feb. 10, 1986

[51] Int. Cl.$^4$ .............................................. A47B 23/00
[52] U.S. Cl. ................................ 280/33.99 A; 108/90; 188/32; 280/33.99 C
[58] Field of Search .................. 280/33.99 R, 33.99 A, 280/33.99 C, 35, 639, 87.02 W; 108/44, 28, 50, 90; 188/32

[56] References Cited

U.S. PATENT DOCUMENTS

| | | | |
|---|---|---|---|
| 2,915,850 | 12/1959 | Goodfellow | 188/32 |
| 3,534,973 | 10/1970 | Elliot | 280/33.99 R |
| 3,804,031 | 4/1974 | Pitts | 108/44 |
| 3,912,291 | 10/1975 | Frisch | 280/33.99 A |
| 4,032,164 | 6/1977 | Frisch | 280/33.99 A |
| 4,274,567 | 6/1981 | Sawyer | 280/33.99 A |
| 4,487,134 | 12/1984 | Foote . | |
| 4,526,419 | 7/1985 | Bowman et al. | 297/153 |

FOREIGN PATENT DOCUMENTS

| | | | |
|---|---|---|---|
| 1175099 | 7/1964 | Fed. Rep. of Germany | 108/44 |
| 2716938 | 10/1978 | Fed. Rep. of Germany | 280/33.99 A |
| 1380595 | 11/1964 | France | 280/33.99 A |

Primary Examiner—John J. Love
Assistant Examiner—Eric D. Culbreth
Attorney, Agent, or Firm—Henderson & Sturm

[57] ABSTRACT

The invention provides a display table attachment for shopping cards of the type generally found in, for example, high volume food marts and like retail outlets. A typical cart has a wheeled frame carrying a basket that has an open top delineated by a peripheral rail structure whose front and rear ends are differently configured, including shapes and dimensions. The inventive table is configured to accommodate the front and rear configurations in such manner that the table top is level at a comfortable height and thus serves admirably for the display of samples, promotional products and the like, usually monitored by an attendant. Specifically, the table is notched, slotted, etc. at its rear to accommodate the wider and higher rail structure at the rear end of the basket and the front end of the table includes a support for elevating the table, in cooperation with the rear end configuration, so as to achieve the level status of the table.

6 Claims, 14 Drawing Figures

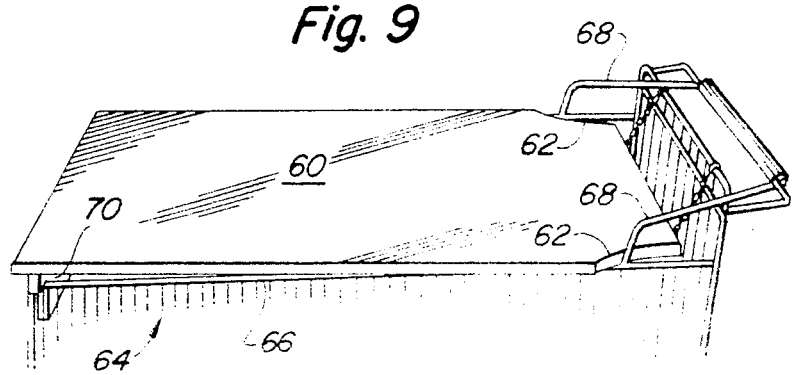
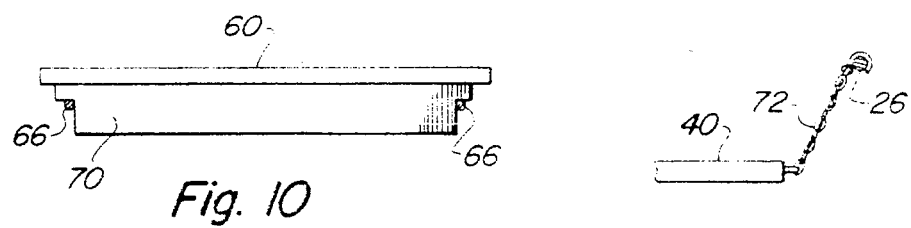
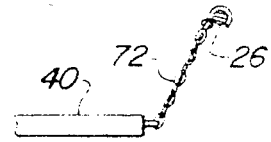
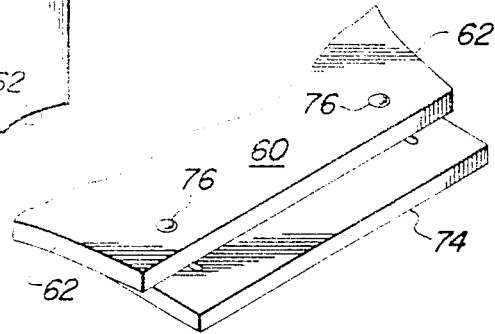
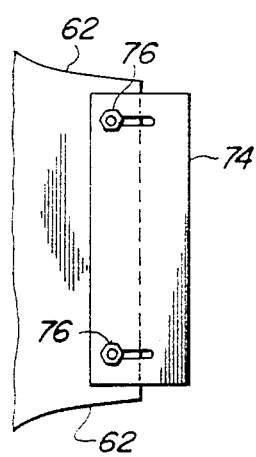

4,679,818

DISPLAY TABLE ATTACHMENT FOR SHOPPING CARTS

BACKGROUND AND SUMMARY OF THE INVENTION

It has become commonplace, in food marts and like retail outlets, to display food samples and other promotional products to stimulate or introduce product lines. One way of accomplishing this is to use conventional tables, portable counters, etc. In many instances, resort has been to the typical card table, which has the disadvantages of relative instability, uncomfortably low and inconvenient height and width, and vulnerability to inquisitive small children. Conventional tables and counter, although portable, are heavy and cumbersome and present storage problems when not in use for display purposes. In at least one instance, as disclosed in the U.S. Pat. No. 4,487,134, to Foote, an attempt has been made to utilize a shopping cart as the base for a table, but the main intended use is as a portable "desk" for the purposes of taking inventory, stocking shelves, etc. No effort has been made in that structure to specifically adapt a top to the tapering basket structure of the cart and thus to dispose the top at a height that is both comfortable for attendants yet high enough to escape the reach of small children. In addition to the many features that will be pointed out herein, and those that will readily occur to those versed in the art, the present invention features a display table attachment that is specially constructed and configured so as to be adaptable to a wide variety of styles of carts; that provides an adequately dimensioned top area suitable for display of samples, promotional articles, etc.; that is stable, easily attached to and detached from the cart for use and storage; that presents a pleasing appearance and lends itself to decorative covering; and that has wheel stops to prevent the cart from rolling after it is set up.

As stated, further objects and features will become apparent as preferred embodiment of the invention are disclosed in detail in the ensuing description and accompanying drawings.

DESCRIPTION OF THE DRAWINGS

FIG. 9 is a perspective of a top portion of a modified form of display table attachment for a cart of a different style.

FIG. 10 is a front view of the modified table, shown in relation to the side rails of the cart basket.

FIG. 11 is a plan of the display attachment of FIGS. 9 and 10.

FIG. 12 is a fragmentary perspective showing a form of table extension.

FIG. 13 is a bottom view of the FIG. 12 structure.

FIG. 14 is a fragmentary elevation of one form of additional table support means.

DETAILED DESCRIPTION OF A PREFERRED EMBODIMENT OF THE INVENTION

Figure 2:
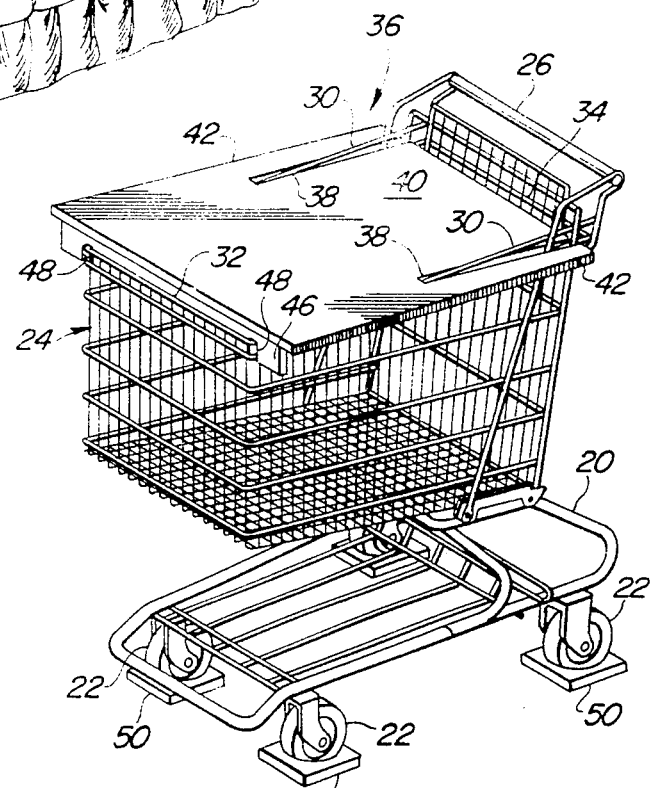
FIG. 2 is a like perspective, but showing the display and cart structure without a cover.
Figure 3:
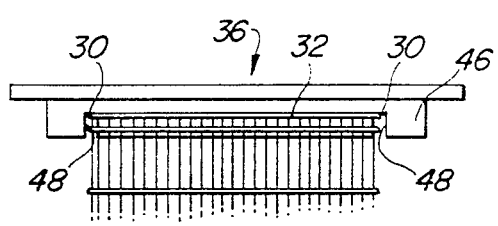
FIG. 3 is a fragmentary front elevation showing one form of support for the front end of the table.
Figure 4:
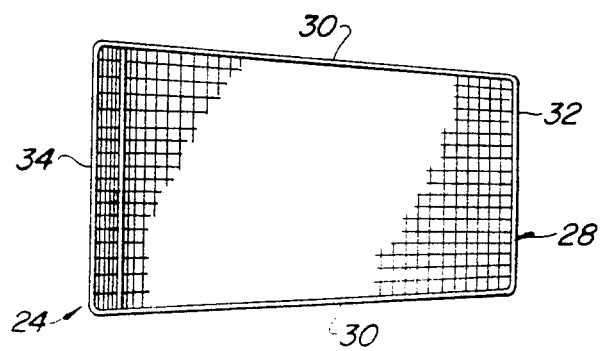
FIG. 4 is a simplified plan of the cart, showing the rear-to-front convergence of the side rails of the top rail structure of the basket.
Figure 5:
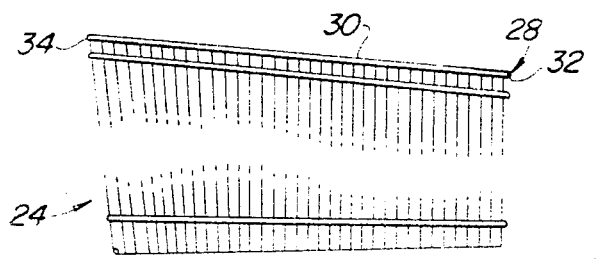
FIG. 5 is a simplified side view, with portions broken away, showing the elevational configuration of the basket of FIG. 4.

Reference will be had first to FIGS. 2, 4 and 5 for a description of a typical shopping cart of the class in which the invention finds principal utility. Such cart comprises a tubular steel or like frame 20 carried by four wheels 22, the front two of which are caster wheels. The frame carries a basket 24 and further includes a rear transverse handle 26 by means of which the cart can be maneuvered. Carts of this type have varying dimensions, even though they have fairly much the same appearance. For example, heights of the top of the basket above the floor at the rear of the basket range between thirty-six and forty-three inches; heights at the basket top front range between thirty and forty-one inches. Transverse dimensions of the basket at the rear vary between twenty and twenty-three inches and at the front between fourteen and nineteen inches. Thus it is seen that a cart of this class has a basket that, with respect to both vertical and transverse dimensions, tapers or converges forwardly, a design dictated by the desire to enable the baskets of successive carts to nest forwardly into the baskets of successive forward carts, the rear of each basket being provided with a hinged rear wall (not shown) to permit such nesting.

In any event, the differences in vertical and transverse dimensions in any one basket means that the top of the basket, as delineated by a peripheral top rail structure 28, will be wider and higher at its rear end than at its front end. Thus, the rail structure, made up of opposite left and right side rails 30 and front and rear transverse or cross rails 32 and 34, respectively, will have its side rails sloping upwardly and rearwardly from the front rail 32 to the rear rail 34. Obviously, a table top placed directly on top of the basket, without more, will slope downwardly and forwardly. Also obviously, one solution is to elevate the front end of a table, as in the aforementioned Foote patent; another solution is to make such table narrow enough throughout so that its rear end can descend into the basket to the level of the basket front rail. Both of these solutions, however, ignore certain fundamental desiderata, such as convenient table height and suitable table width and length, both of which must be carefully considered in view of the dimensional variations from one cart to another.

According to the invention, both objectives are achieved; that is a level table top disposed at a convenient height and having a work or display area of adequate size. A convenient height is that of the typical kitchen counter; e.g., on the order of thirty-six inches. A convenient area is one whose length is about equal to the fore-and-aft dimension of the basket 24 and whose basic width exceeds that of the top of basket by, say, three to six inches at either side of the basket.

Figure 6:
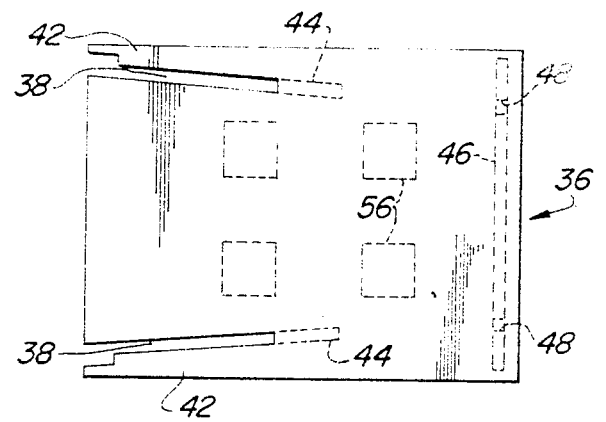
FIG. 6 is a top view of th table by itself.
Figure 7:
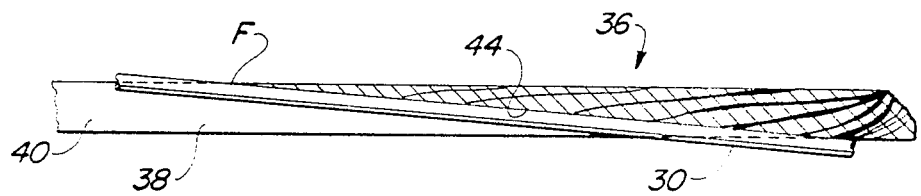
FIG. 7 is an enlarged fragmentary, longitudinal section showing the relationship of a basket top rail to a slotted and grooved part of the table.

In that form of the invention shown in FIGS. 1 through 7, a table top, designated in its entirety by the numeral 36, is constructed in such manner as to possess configurations accommodating those of the top rail structure of the basket, especially as to the rear portions of the side rails 30. In its present embodiment, the table top is a rectangle of three-fourths inch plywood; although, it is contemplated that other materials could be used. The rear portion of the table top is configured (including dimensioning) to accommodate the side rail rear portions, here by the provision of a pair of slots 38 which extend forwardly from the rear end of the table top and which converge on the order of the convergence of the side rails 30, whereby, when the table top is disposed atop the rail structure, a reduced-area portion 40 of the table top (as provided between the slots) will fit between the upwardly projecting portions of the side rails and overhanging portions 42 of the table top (outwardly of the slots) will extend respectively laterally beyond the side rails. As a further adjunct to fitting the table top to the rear portions of the side rails, the under portion of the table is routed or otherwise fashioned to provide tapering grooves 44 respectively as forward extensions of the grooves (FIGS. 6 and 7). Each groove is so formed as to fit a substantial lengthwise section of its side rail, thus improving the stabilization of the table top relative to the rail structure.

The level status of the table top is achieved by the provision at its forward end of elevating means, here in the form of a cross member 46 (FIG. 3) formed with notches 48 secured to the bottom of the table top and which respectively receive the forward portions of the side rails just to the rear of the front cross rail. The table top may forwardly overhang the front rail so as to further increase the display area. See also FIG. 2. The engagement of the notches and the relationship of the cross member to the front rail prevents the table top from shifting forwardly and laterally, and the engagement of the slots 38 with the rear portions of the side rails prevents the rear of the table top from lateral shifting. The length of the table top is such that it fits rather closely ahead of the rear wall of the basket and thus cannot shift material rearwardly. Essentially, the table top is mounted and dismounted in a substantial vertical manner. As already indicated, one advantage of the slotted or configured table top is that, by accepting the high rear portions of the side rails, the level of the table top is convenient, yielding useful height on the order of thirty-six inches as compared to a rear basket height of, say, forty-one to forty-three inches, which is a factor to be regarded as of some significance when it is noted that attendants or monitors of the displays are usually women who are typically a bit shorter than men. Further, the configuration enables an increased area of the table top for better display of articles, products, etc., in this instance an area having a width on the order of thirty or more inches as compared to a basket width of twenty to twenty-three inches and a length of thirty-six inches.

Figure 1:
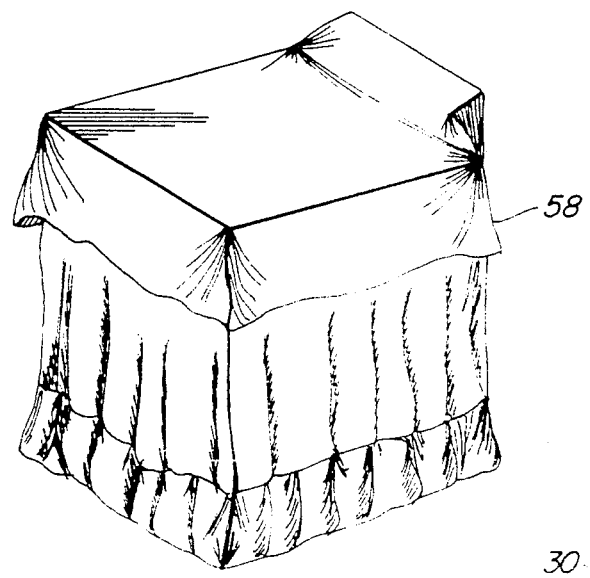
FIG. 1 is a reduced scale perspective of a completed display, featuring a decorative cover.
Figure 8:
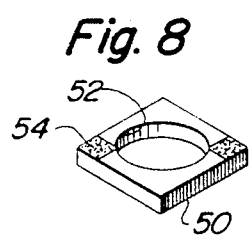
FIG. 8 is a perspective of a wheel block or stop.

A table top attachment as described may be furnished as a kit, including a plurality of wheel blocks or stops 50 (FIGS. 2 and 8), which may be squares of plywood or any suitable material, each having a recess or opening 52 for receiving a wheel. The use of these immobilizes the cart during its display mode. Provision is made for the storage of the blocks when not in use preferably by using releasable means whereby the blocks may be removably attached to the underside of the table top, as by velcro pads 54 and 56 on the blocks and top, respectively (FIGS. 6 and 8). Also, a suitable attractive cover 58 may be included as a finishing touch (FIG. 1). The higher rear area as provided by the upwardly projecting rear portions of the side rails may serve as a limit or fence for the products, etc. displayed at that end.

In the modifications shown in FIGS. 9 through 12, a table top 60 has a rear end portion reduced in lateral dimension by the provision of a configuration including cut-away portions or notches 62 respectively at opposite sides of the table top. This arrangement will accommodate the configuration of a top rail structure 66 of a cart 64 that has a less sloping profile; that is, the side rails of the rail structure 66 do not have such a pronounced slope as the side rails previously described; or the rear part of the basket may be of the type in which handle braces 68 would interfere with a strictly rectangular table top. The front of the table top may be supported on the basket structure by a depending front part 70, similar to that previously described, notched to receive the forward parts of the side rails of the structure 66. See FIG. 10.

In using some carts, it will be found that the configuration of the rear part of the table top to adapt to that of the basket rail structure may cause an appreciable rear overhang of the table top relative to its contact with the side rail portions, in which case those rail portions tend to serve as fulcra about which the table top may rock downwardly at its rear. This would be especially true in the case of the table top and cart arrangement of FIGS. 1–7. Note especially the area designated at F in FIG. 7. To counter this possibility it is necessary in some carts to provide means, such as chains 72, for connection between the rear of the table top and the adjacent cart part, such as the handle 26. See FIG. 14.

Further, some baskets are longer than others and in order to minimize the number of different table tops, some tops can be provided with longitudinal extenders, as best seen in FIGS. 12 and 13. A preferred form is a flat member 74 secured to the underside of the table top by bolt, nut and slot means 76. This arrangement, although shown in the drawings as applied to the table top 60, is equally applicable to table tops based on the design of FIGS. 1–7. Also, the wheel blocks 50 and cover 58 may be used with various table tops. In general, features of the two forms of table top shown may be interchanged and adapted from one to the other.

As will have been seen from the foregoing, a novel arrangement of table top and cart ensemble has been provided for the purposes intended, one that provides a convenient and roomy display area at low cost and embracing design features that enable production, distribution and use of the invention in a simple and facile manner. Features and advantages not specifically pointed out in the foregoing will become readily apparent to those versed in the art, as will many modifications and alterations in the preferred embodiments disclosed.

I claim:

1. A display table attachment for use with a shopping cart having a top-opening basket including front and rear transverse rails and left and right fore-and-aft side rails that together define a peripheral top rail structure that has a configuration such that the rear rail is higher than the front rail and the side rails slope downwardly and forwardly and also converge from front to rear: said display table attachment adapted to overlie and be supported by the rail structure and having a top flat surface of substantially rectangular shape dimensioned to extend from front to rear and side to side of the rail structure, front engagement means depending from the front part of the table for engagement with the front portion of the rail structure to hold the table against lateral and at least forward shifting relative to the basket, the rear part of the table being configured to adapt to the configuration of, and to be supported by, the rear portion of the rail structure, said rear table part configuration having notches converging on the order of the converging side rails and enabling the rear part of the table to descend below the level of the high rail portion and thus to enable the overall level position of the table top surface and to stabilize the table against shifting laterally and rearwardly relative to the basket, and said front engagement means on the table being so dimensioned in cooperation with the configuration of the rear part of the table as to elevate the front part so that the table top surface as a whole is substantially level.

2. The table attachment of claim 1, in which the notched portions are converging slots terminating short of the front part of the table and the table thus has opposite lateral extensions respectively outwardly of the side rails.

3. The table attachment of claim 2, in which the under side of the table includes downwardly opening grooves respectively providing downwardly and forwardly sloping extensions of the slots.

4. The table attachment of claim 1, including means on the rear part on the table to support the rear part on the basket in addition to the support afforded by the table resting on the basket.

5. The table attachment of claim 4, in which the additional means is selectively connectible to and disconnectible from the basket.

6. The table attachment of claim 1, including an extension element carried by the rear part of the table for selective fore-and-aft extension and retraction according to the length of the basket.

* * * * *

UNITED STATES PATENT AND TRADEMARK OFFICE
CERTIFICATE OF CORRECTION

PATENT NO. : 4,679,818

DATED : July 14, 1987

INVENTOR(S) : Dorothy A. Kakavas

It is certified that error appears in the above-identified patent and that said Letters Patent are hereby corrected as shown below: Title page:

In the Abstract, line 2, "cards" should read --carts--. Column 1, line 17, "counter" should read --counters--; line 59, "th" should read --the--. Column 3, line 18, "grooves" should read --slots 38--.

Signed and Sealed this

Thirty-first Day of May, 1988

Attest:

DONALD J. QUIGG

*Attesting Officer*  *Commissioner of Patents and Trademarks*